Aug. 11, 1925.
G. J. BUCQUET
1,549,522
WATER FILTER
Filed April 21, 1924
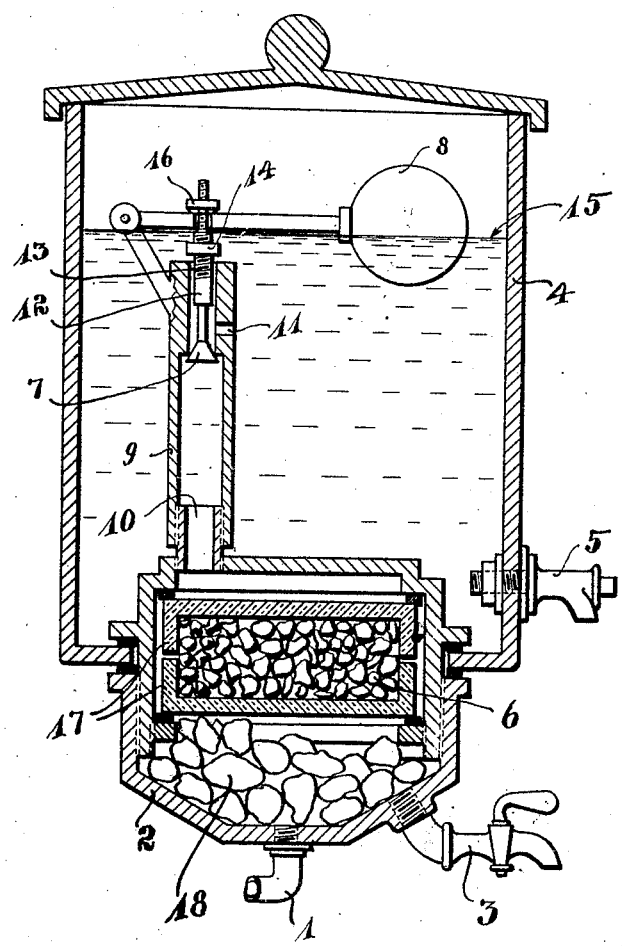
INVENTOR:
GEORGES J. BUCQUET,
By: Otto H. Rueger,
his Atty.

Patented Aug. 11, 1925.

1,549,522

UNITED STATES PATENT OFFICE.

GEORGES J. BUCQUET, OF LOS ANGELES, CALIFORNIA.

WATER FILTER.

Application filed April 21, 1924. Serial No. 707,954.

*To all whom it may concern:*

Be it known that I, GEORGES J. BUCQUET, a citizen of the United States, residing at Los Angeles, in the county of Los Angeles and State of California, have invented a new and useful Water Filter, of which the following is a specification.

This invention relates to devices used in households and other similar places for purifying drinking water.

One of the objects of this invention is to provide a device that can be attached to a faucet in a kitchen or other suitable places so that the drinking water may pass from the faucet through the device when water is drawn from the device, serving to filter the water passing through the device.

Another object is to provide a float-control for such a filter or purifier, so that a filtering or purifying can be accomplished in a certain manner regardless of the amount of water drawn from the device, the float-control being adjustable so that the flow of water can be controlled to not overtax the purifying medium of the device.

Another object is to provide a holding-chamber for the purifying medium of a form to be removable and exchangeable.

Another object is to provide a device with separate faucets for drinking water and for unpurified water, the faucets being arranged so that a cleaning of the filtering or purifying medium can be accomplished when un-filtered water is drawn.

Other objects will appear from the following description and appended claims as well as from the accompanying drawing, in which—

The figure is a general vertical mid-sectional view of a device embodying the invention.

Water delivered through city mains is not always the purest and it is very desirable to purify or filter such water to be used for drinking purposes.

On the other hand, well filtered or purified water cannot always be obtained, especially in small towns.

A small device, holding a filtering or purifying medium, to be attached directly to the front of a water faucet, in direct line of the passing water has certain drawbacks, since a filtering medium is overtaxed easily when a large amount of water is drawn through such a device, especially if drawn at a quick rate.

The invention as described and disclosed herewith is intended to eliminate an over-taxing of a filtering medium, by having a float-control inserted by which water may be caused to flow very slowly through the filtering medium regardless of how fast or quickly filtered or purified water is drawn from the device.

1 designates the end of a common water faucet or water connection as used in kitchens and other similar places. Such a faucet or a termination of a water connection, is however, preferably turned around so as to discharge in an upward direction, if not already so disposed. The bowl 2 is mounted on top of such a faucet or water connection. A regular water faucet 3 is applied to the bowl at a point spaced from the first-named connection, from which unfiltered water may be drawn in normal manner.

A reservior 4 is mounted on top of the bowl 2 for holding filtered or purified water. A faucet 5 is provided for drawing pure water from the reservoir 4. The filtering medium 6, such as charcoal, is inserted or disposed between the lower bowl 2 and the reservoir 4, in the path of water coming from the connection 1 to enter the reservoir 4.

The flow of water from the connection 1 through the filtering medium 6, to enter the reservoir, is controlled by a float-controlled valve, the valve being indicated at 7 and the float being indicated at 8. A housing or structure 9 is provided for controlling the passage of water and for supporting the valve control, embodying a conduit 10 and a water discharge opening 11. The valve 7 is disposed so that the passage of water from the conduit 10 to the discharge opening 11 can be controlled and checked. The valve stem 12 is threaded as indicated at 13 having a nut 14 disposed on the threaded portion of this stem, so that the movement of the valve 7 can be regulated by an adjustment of the nut 14.

No matter how quickly or how fast water may be drawn from the reservoir 4 through the faucet 5, by close adjustment of the nut 14 in relation to the valve 7, the replenishing of the water in the reservoir 4 through the conduit 10 can be controlled so that the filtering medium 6 is never overtaxed by a careless or an otherwise drawing of water through the faucet 5.

The level of the water in the reservoir 4 is indicated at 15, and, from the above, it will easily be understood that this level may fall to quite an extent, eventually leaving the float above the water level merely supported by the valve stem 12, without materially affecting the operation of the device and thereby the replenishing of water to the reservoir 4.

To change or adjust the mechanism in order to obtain a different water level, the nut 16 is provided on the valve stem 12, so that the movement of the float in relation to the valve 7 may be adjusted.

For holding the charcoal or any other filtering medium disposed between the lower bowl 2 and the reservoir 4, suitable bowls 17 are illustrated in the drawing. These bowls 17 are preferably made of coarse material, as cement or earthenware, tending to serve to some extent to filter the water passing through the device.

A cleaning medium, such as gravel, is disposed in the bowl 2, as indicated at 18, to partly fill this bowl. A drawing of water from the faucet 3, tends to agitate the gravel at 18 in such a manner as to scrape and clean the underside of the bowls 17, so that sediment may be removed from the bowl 2 by drawing water from the faucet 3.

Having thus described my invention, I claim:

1. In a filter of the class described, in combination with the common water connection in a house, a bowl mounted on top of said water connection, a reservoir mounted on top of the said bowl, a filtering medium disposed between the bowl and the reservoir, discharging means on the bowl for drawing off unfiltered water from the water connection by way of the bowl before the water has entered the reservoir, and discharging means on the reservoir for drawing off filtered water.

2. In a filter, of the class described, a reservoir embodying a filter-bed and a space below the filter-bed, water supplying means and water discharging means in communication with the said space below the filter-bed, and a cleaning medium disposed in the said space so that the medium may be agitated for cleaning the underside of the filter-bed when water is passed through the water supplying means and water discharging means.

3. In a filter of the class described, in combination with a water hydrant, a bowl mounted on top of the said hydrant, a reservoir mounted on top of the said bowl, a container for a filtering medium disposed between the bowl and the reservoir, a cleaning medium disposed in the bowl below the container, a float-controlled valve in the reservoir above the container disposed so as to maintain the water level in the reservoir at a desired height, discharging means for filtered water on the reservoir whereby more water is allowed to pass into the reservoir as soon as the water descends within the reservoir so as to actuate the float-controlled valve, and discharging means on the bowl for drawing unfiltered water and adapted to agitate the cleaning medium in the bowl so as to clean the underside of the said container.

In testimony that I claim the foregoing as my invention I have signed my name.

GEORGES J. BUCQUET.